June 19, 1956   C. W. HELSEY, JR., ET AL   2,750,953
FLUID FLOW PROPORTIONER
Filed Dec. 19, 1952   3 Sheets-Sheet 1

Inventors
Charles W. Helsey Jr.,
Stuart R. Nutsche &
Edward Orent
By
Willits, Helmig & Baillio
Attorneys June 19, 1956  C. W. HELSEY, JR ET AL  2,750,953
FLUID FLOW PROPORTIONER Filed Dec. 19, 1952   3 Sheets-Sheet 2

Inventors
Charles W. Helsey Jr.,
Stuart R. Natsche &
Edward Orent
By Willits, Helwig & Baillio
Attorneys

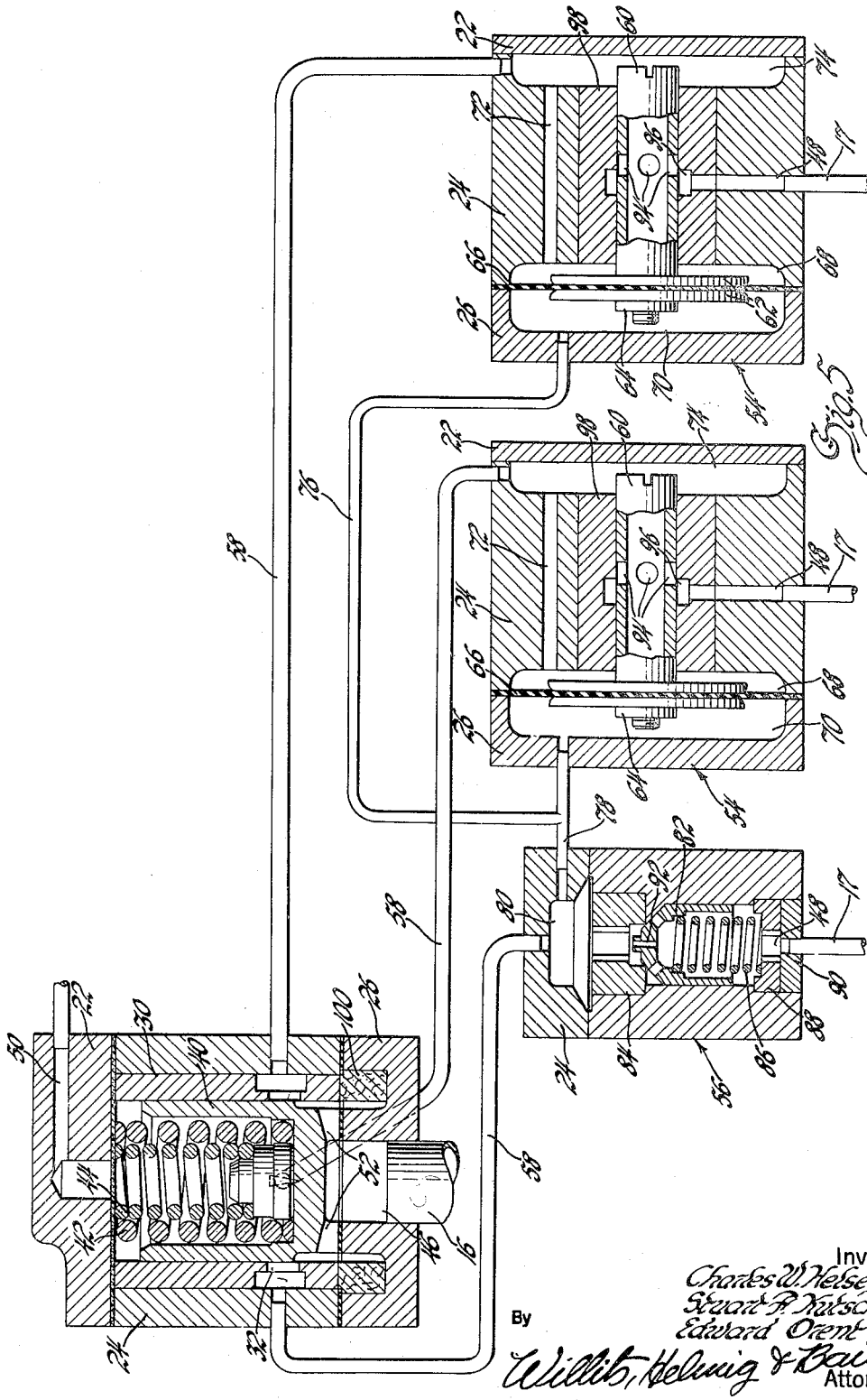

2,750,953

FLUID FLOW PROPORTIONER

Charles W. Helsley, Jr., Pacific Palisades, Calif., and Stuart F. Kutsche and Edward Orent, Grand Rapids, Mich., assignors to General Motors Corporation, Detroit, Mich., a corporation of Delaware Application December 19, 1952, Serial No. 326,956

6 Claims. (Cl. 137—118)

This invention relates to fluid flow proportioners for automatically insuring predetermined rates of flow through a plurality of discharge conduits, and more particularly, to a means for providing a wide flow range without the production of excessive pressures in the fluid system.

The invention is predicated on the fact that the flow through a plurality of discharge conduits may be maintained in predetermined proportionality despite variations of pressure conditions in the conduits by providing the conduits with flow restrictors of predetermined areas relative to each other and with means to maintain equal pressure drops across the restrictors. A usual type of flow proportioner in accordance with this fact is shown in British Patent 577,132.

Flow proportioners of this nature are commonly used to supply liquid fuel at equal flow rates to the atomizing nozzles of the combustor of a gas turbine engine, although it should be understood that they are capable of application in a wide variety of other fluid distribution systems. A major disadvantage of flow proportioners prior to this invention was their inability to operate over a wide flow range without exceeding reasonable pressures in the system because they were provided with fixed area restrictors, and the flow through a restrictor is proportional to area of the restrictor times the square root of the pressure drop across the restrictor.

An object of the invention is to provide a flow proportioner capable of operation over a wide flow range at reasonable system pressures. The invention is accomplished by providing a flow proportioner with variable area restrictors so associated that their respective areas are varied concurrently with each other. With fixed area restrictors the flow range, that is, the ratio of maximum rate of flow to minimum rate of flow, is approximately 25 to 1 at reasonable pressures in the system. With variable area restrictors the flow range may be increased to 250 to 1 without exceeding reasonable pressures in the system.

Further objects and advantages of the present invention will be apparent from the following description, reference being had to the accompanying drawings wherein the preferred form of the present invention is clearly shown.

Fig. 5 is a diagrammatic representation of the flow proportioner to illustrate the operation of the device.

Figure 1:
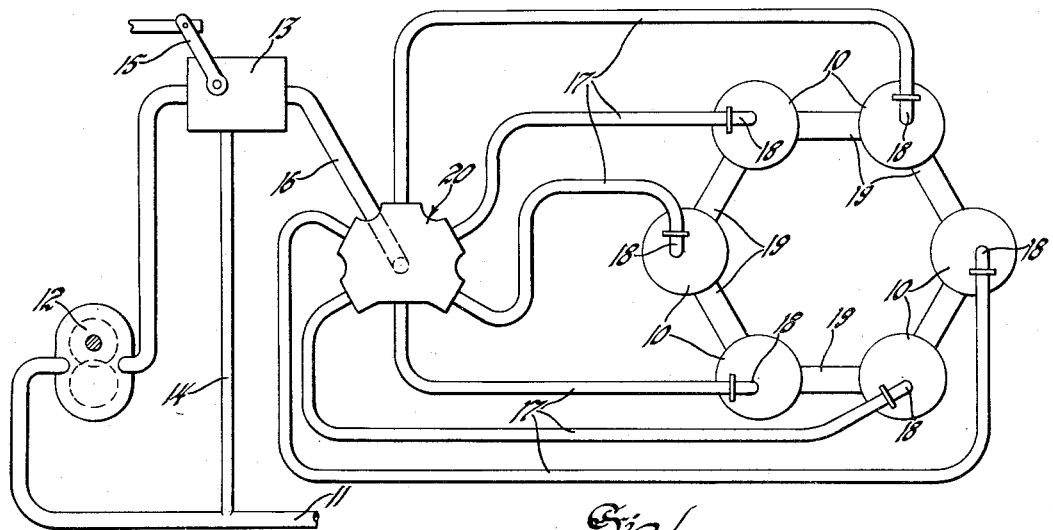
Fig. 1 is a schematic diagram of a gas turbine fuel distribution system incorporating the invention.
Figure 1:

Referring to Fig. 1, a plurality of combustion chambers of an aircraft gas turbine engine are indicated at 10. Further illustration of the engine is deemed immaterial to the understanding of the invention as the structure of such an engine is generally understood. The combustion chambers are supplied with fuel in a conventional manner from a fuel line 11 by a pump 12 and a fuel quantity control unit 13 which is provided with a by-pass line 14 to the pump inlet. A lever 15 provides variable control for the unit 13 and the metered fuel from the unit is delivered by a line 16 to the flow proportioner 20. The flow proportioner 20 divides the fuel from the line 16 in a predetermined (preferably equal) manner between the combustion chamber fuel supply conduits 17 regardless of pressure variation in the conduits. The conduits 17 are provided with single inlet nozzles 18, preferably of the variable area type, which discharges the fuel into the combustion chambers 10. The invention is not concerned with details of the fuel nozzles or other injection means and they may be of conventional design. A plurality of crossover tubes 19 may interconnect the combustion chambers to minimize gas pressure differentials between them in accordance with the usual practice.

Figure 2:
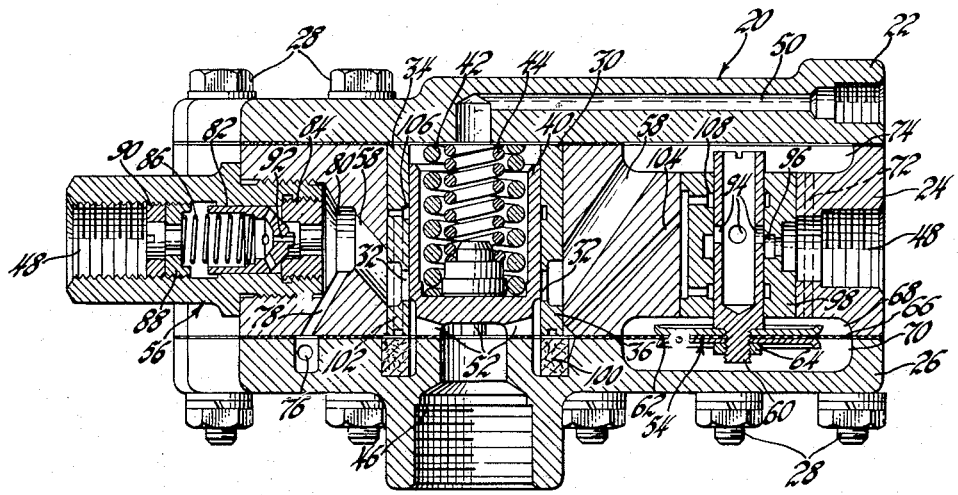
Fig. 2 is a sectional view of a constructional form of the flow proportioner taken on the plane indicated by the line 2—2 of Fig. 3.
Figure 3:
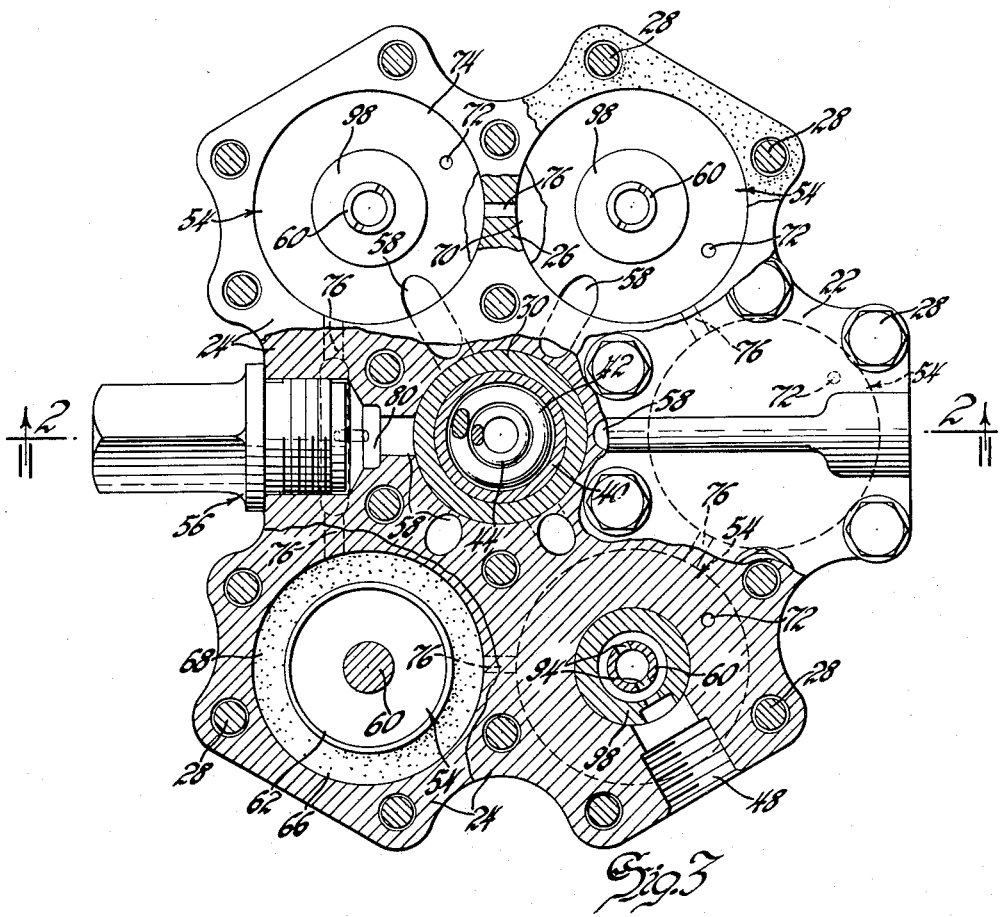
Fig. 3 is a plan view, partially broken away, of the constructional form of the flow proportioner.
Figure 4:
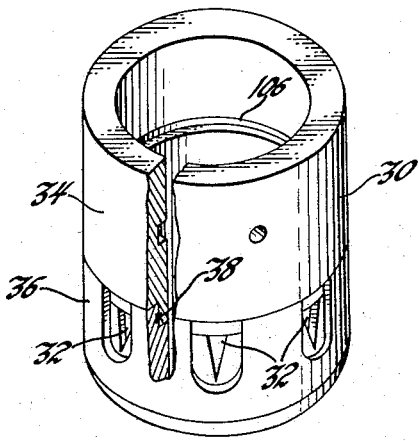
Fig. 4 is a perspective view, partially broken away, of a variable area multi-restrictor sleeve.

The flow proportioner 20 (Figs. 2 and 3) comprises a tripartite body including an upper member or cover 22, an intermediate member or body 24 and a lower member or cover 26 secured together by bolts 28. A sleeve 30 (see also Fig. 4) received in a central bore in the body 24 is provided with a plurality of triangular shaped restrictor orifices 32 with the apices down. The sleeve 30 is formed from an upper sleeve 34 and a lower sleeve 36 which are flanged and brazed together at 38 as best seen in Fig. 4. Before these sleeves are assembled the upper edge of the sleeve 36 is precision ground to provide a plurality of V-shaped slots with the apices down, these slots defining with the lower edge of the sleeve 34 the triangular restrictor orifices 32 upon assembly. A separate restrictor 32 is provided for each combustion chamber fuel supply conduit 17. A reciprocable metering piston 40 (Figs. 2 and 3) is urged downwardly in the sleeve 30 by the springs 42 and 44 to vary the discharge areas of the restrictors 32.

The restrictors 32 are preferably formed as isosceles triangles with their down apices, i. e., the junctions of their equal sides, in a common perpendicular plane respective to the sleeve and piston axis and the lower peripheral edge of the piston is preferably in a parallel plane so that it serves as a variable base for each of the isosceles triangles to simultaneously vary the effective discharge areas of the restrictors on piston movement. Equal proportioning of the flow to the discharge conduits 17 over a wide flow range is achieved by forming the restrictors with equal down apex angles, while unequal, but constant, proportioning of the flow is achieved by forming the restrictors with unequal down apex angles. Variable predetermined proportioning of the flow may be achieved by forming the restrictor orifices in the sleeve 30 to other predetermined shapes and/or the peripheral edge of the piston 40 to a predetermined cam outline. Equal proportioning of the flow is desired in the particular jet engine fuel system illustrated, and therefore the down apex angles of the flow regulator 20 are shown as equal.

The fuel control unit 13 supplies fuel to the underside of the piston 40 through the flow proportioner inlet passage 46 for equalized distribution to the combustion chambers through the flow proportioner outlet passages 48. A drain passage 50 vents the upper side of the piston 40 so that the piston moves upward to increase the discharge areas of the restrictors 32 in accordance with increasing fuel pressures in the inlet passage 46 as the flow requirements of the combustion chamber nozzles increase. The underside of the piston is preferably formed with legs 52 of sufficient length to maintain a slight amount of restrictor opening at all times.

A plurality of restrictor pressure drop regulating valves 54 and a restrictor pressure drop control valve 56 are arranged around the variable area restrictor sleeve 30 to deliver fuel through exit passages 48 to the combustion chamber nozzles. The valves 54 and 56 are fed by passages 58 in the body 24 that communicate with the outlets of the respective restrictors 32. Each of the regulating valves 54 includes a reciprocable sleeve valve 60 secured by disks 62 and nut 64 to a flexible valve actuating diaphragm 66 which separates complementally cored portions in the body 24 and cover 26 to form expansible chambers 68 and 70 therewith. Each chamber 68 connects by a passage 72 to a chamber 74 which receives fuel from its respective passage 58.

The chambers 70 of the regulating valves are connected with each other by cross passages 76 (Fig. 2) in the lower member 26 and with the chamber 80 of the control valve 56 by a vertical passage 78 in the body 24. The chamber 80 receives fuel from its restrictor 32 through its radial passage 58. The purpose of the control valve 56 is to maintain a higher pressure in the chamber 80 than any pressure which may be expected in the discharge conduits 17 under ordinary operating conditions, and this is accomplished by a piston valve 82 which is biased against a valve seat 84 by a coil spring 86.

The purpose of the regulating valves 54 is to maintain their respective restrictor outlet pressures in equality with each other so that equal pressure drops will be maintained across the restrictors and thereby equal rates of flow through equal area restrictors or predetermined rates of flow through unequal predetermined area restrictors. This is accomplished by providing each of the sleeve valves 60 with an actuating diaphragm 66 which responds to the pressure differential between its restrictor outlet and the common regulating pressure set by the control valve 56 to position the sleeve valve 60 to set its restrictor outlet pressure in accordance with the regulating pressure.

A threaded sleeve 88 and a lock ring 90 provide adjustment for the spring loading of the resistance or piston valve 82, which is preferably provided with a small starting by-pass orifice 92. The sleeve valves 60 of the pressure regulating valves 54 deliver fuel from the chambers 74 through ports 94 which cooperate with the annular chambers 96 of the valve seat sleeves 98 to throttle the fuel flow to achieve a common restrictor outlet pressure.

A filter 100 in the inlet of the flow proportioner 20 transmits a very small amount of finely filtered fuel through passages 102 and 104 and the annular chambers 106 and 108 to the rubbing surfaces of the metering piston 40 and the sleeve valves 60 to prevent the introduction of grit-like foreign matter between the surfaces and possible sticking of the valves in accordance with the teachings of Serial No. 300,630 (Wiggans) filed July 24, 1952, on Protective Filtering System.

Referring now to the diagram of Fig. 5 to review the operation of the device, the main supply conduit 16 supplies fuel under variable pressure to the various parallel fuel supply conduits 17 through the flow proportioner in equal quantities per unit time. Pressure variation in the common inlet chamber 46 moves the metering piston 40 to increase or decrease the openings of the restrictors 32 which individually feed the interconnected chambers 74 and 68 of the regulating valves 54 and the chamber 80 of the control valve 56. The restrictors 32 are varied in area identically and the flow through the restrictors is identical as long as an equal pressure drop is maintained across them. One of the restrictors 32 feeds the chamber 80 of the control valve 56 which is maintained at a pressure higher than any pressure expected in the fuel supply conduits 17 under ordinary operating conditions by the spring 86 and valve member 82. This pressure is communicated to the chambers 70 of the regulating valves 54 so that the sleeve valves 60 move as necessary to equalize the pressures in the chambers 70 and the interconnected chambers 68 and 74. Since the pressures in the chambers 74 and the chamber 80 are thereby equalized and since the pressure in the inlet chamber 46 is common to all the restrictors 32, an equal pressure drop across each restrictor 32 is created and thereby equal flow through each of the restrictors.

The flow through each of the fuel supply conduits 17 and through their associated nozzles is thereby equalized despite operating variations of pressure between the fuel supply conduits such as results from the practical impossibility of absolutely matching the individual flow characteristics of the nozzles to each other and the dissimilar pressure patterns developed in the combustion chambers during engine operation.

Obviously, use may be made of the pressure from an independent fluid circuit to regulate the pressure in the chambers 70 in lieu of the resistance valve 56 if desired. In some instances, it is desirable to provide a fuel nozzle which has a definitely higher resistance to flow than the other fuel nozzles and apply its upstream pressure to the chambers 70 in lieu of the pressure in the chamber 80 of the resistance valve, that is, either a resistance valve or a high resistance nozzle may be used to provide a regulating or pilot pressure for the regulating valves 54.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

We claim:

1. A unitary flow proportioner for maintaining predetermined rates of flow over a wide flow range in a plurality of conduits supplied in parallel from a common source of fluid under pressure comprising a valve housing including a main body member, a cover member on one side of the body member, and a cover member on the opposite side of the body member; a metering valve including an open-ended liner sleeve in the body member extending between the cover members, a piston reciprocable in the liner sleeve, an inlet passage in one cover member to connect the common source of fluid with one end of the liner sleeve and piston, a vent passage in the opposite cover member communicating with the opposite end of the liner sleeve and piston, a compression spring in the opposite end of the liner sleeve between the piston and opposite cover member, and a plurality of restrictor orifices arranged around the wall of the one end of the liner sleeve so that the effective areas thereof are varied by piston movement in response to fluid pressure changes in the one end of the liner sleeve acting against the compression spring in the opposite end of the liner sleeve; a pressure control passage in the body member to connect one of the conduits with the discharge side of one of the restrictor orifices; a resistance valve in the pressure control passage to retard flow therethrough; and a plurality of throttling valves arranged around the metering valve each including an open-ended insert sleeve in the body member extending between the cover members, a discharge port in the wall of the insert sleeve to connect with a respective conduit, a pair of interconnected chambers formed between the cover members and body member at the ends of the insert sleeve, a passage in the body member connecting one of the chambers to the discharge side of a respective restrictor orifice, a flexible diaphragm between the body member and one cover member separating the chamber at that end of the insert sleeve into a body chamber and cover chamber, passages in the body member and the last mentioned cover member connecting the cover chamber to the pressure control passage between the resistance valve and associated restrictor orifice, a piston reciprocable in the insert sleeve connected to the flexible diaphragm for movement in response to a pressure differential between the body and cover chambers, and a passage in the piston controlling communication between the discharge port and interconnected chambers in accordance with piston movement.

2. Apparatus in accordance with claim 1 wherein the liner sleeve is an assembly of a pair of sleeves joined together in end-to-end relation, the joined end of one sleeve having a plurality of V-shaped slots that define the restrictor orifices with the joined end of the other sleeve.

3. Apparatus in accordance with claim 1 wherein the metering valve piston has legs extending in the inlet passage end of the liner sleeve to engage the cover member and maintain a slight amount of restrictor opening at all times.

4. Apparatus in accordance with claim 1 including a filter in the inlet passage and a plurality of passages in the body member and sleeves between the outlet side of the filter and the sleeve rubbing surfaces of the respective pistons to prevent the introduction of foreign matter between the rubbing surfaces.

5. Apparatus in accordance with claim 1 wherein a small by-pass orifice is provided through the resistance valve.

6. A unitary flow proportioner for maintaining predetermined rates of flow over a wide flow range in a plurality of conduits supplied in parallel from a common source of fluid under pressure comprising a valve housing including a main body member, a cover member on one side of the body member, and a cover member on the opposite side of the body member; a metering valve including an open-ended liner sleeve in the body member extending between the cover members, a piston reciprocable in the liner sleeve, an inlet passage in one cover member to connect the common source of fluid with one end of the liner sleeve and piston, a vent passage in the opposite cover member communicating with the opposite end of the liner sleeve and piston, a pair of nested compression springs in the opposite end of the liner sleeve between the piston and opposite cover member, and a plurality of triangular shaped restrictor orifices arranged around the wall of the one end of the liner sleeve so that the effective areas thereof are varied by piston movement in response to fluid pressure changes in the one end of the liner sleeve acting against the compression springs in the opposite end of the liner sleeve; a pressure control passage in the body member to connect one of the conduits with the discharge side of one of the restrictor orifices; a resistance valve in the pressure control passage to retard flow therethrough; and a plurality of throttling valves arranged around the metering valve each including an open-ended insert sleeve in the body member extending between the cover members, a discharge port in the wall of the insert sleeve connecting with a respective conduit, a pair of interconnected chambers formed between the cover members and body member at the ends of the insert sleeve, a passage in the body member connecting the chambers to the discharge side of a respective restrictor orifice, a flexible diaphragm between the body member and one cover member separating the chamber at that end of the insert sleeve into a body chamber and cover chamber, passages in the body member and one cover member connecting the cover chamber to the pressure control passage between the resistance valve and associated restrictor orifice, a piston reciprocable in the insert sleeve connected to the flexible diaphragm for movement in response to a pressure differential between the body and cover chambers, and a passage in the piston controlling communication between the discharge port and interconnected chambers in accordance with piston movement.

References Cited in the file of this patent

UNITED STATES PATENTS

| | | |
|---|---|---|
| 2,430,264 | Wiegand | Nov. 4, 1947 |
| 2,601,849 | Lee | July 1, 1952 |
| 2,606,066 | Thompson | Aug. 5, 1952 |
| 2,622,610 | Rowe | Dec. 23, 1952 |
| 2,638,912 | Lee | May 19, 1953 |
| 2,656,848 | Noon et al. | Oct. 27, 1953 |
| 2,661,756 | Noon et al. | Dec. 8, 1953 |
| 2,664,910 | Boyd et al. | Jan. 5, 1954 |

FOREIGN PATENTS

| | | |
|---|---|---|
| 577,132 | Great Britain | May 7, 1946 |